Jan. 15, 1935.  F. A. PARSONS  1,987,909
TRANSMISSION AND CONTROL MECHANISM FOR MACHINE TOOLS
Filed Sept. 2, 1931   4 Sheets-Sheet 1
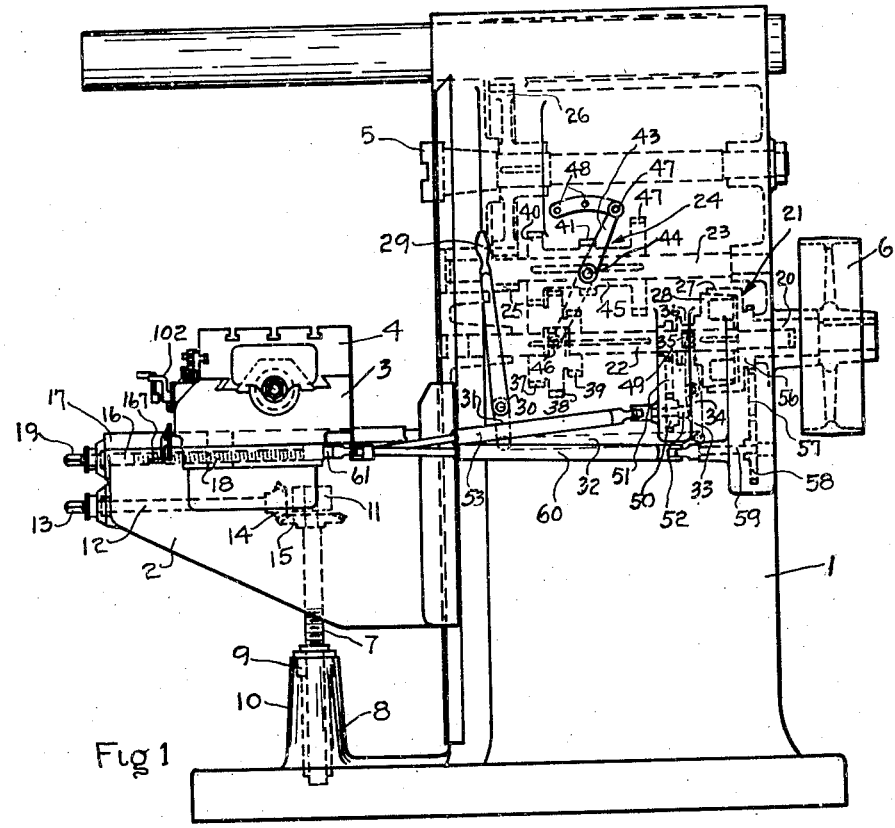
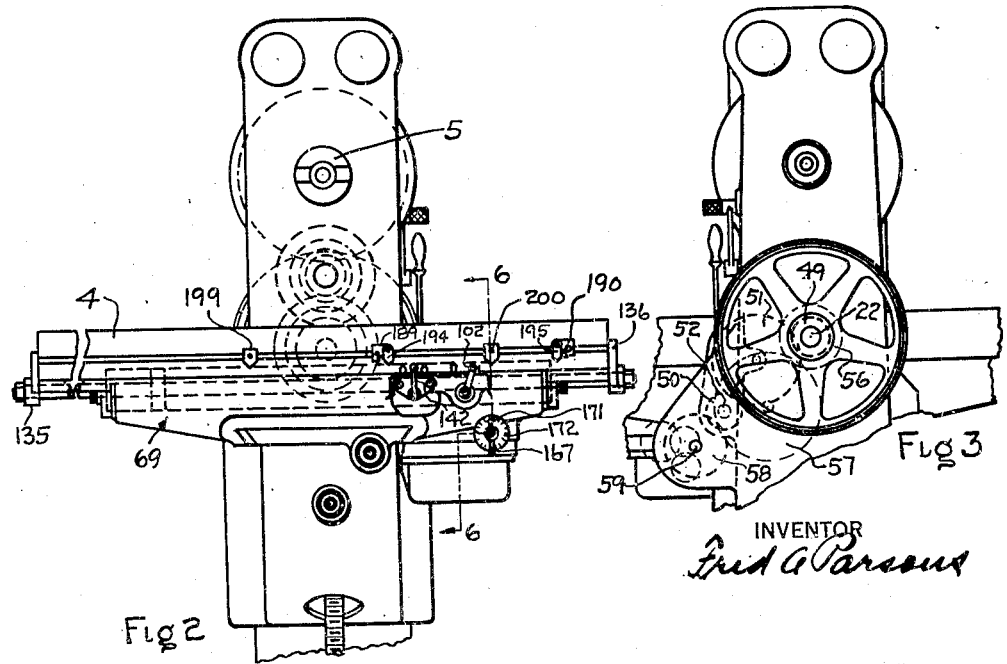
INVENTOR
Fred A Parsons

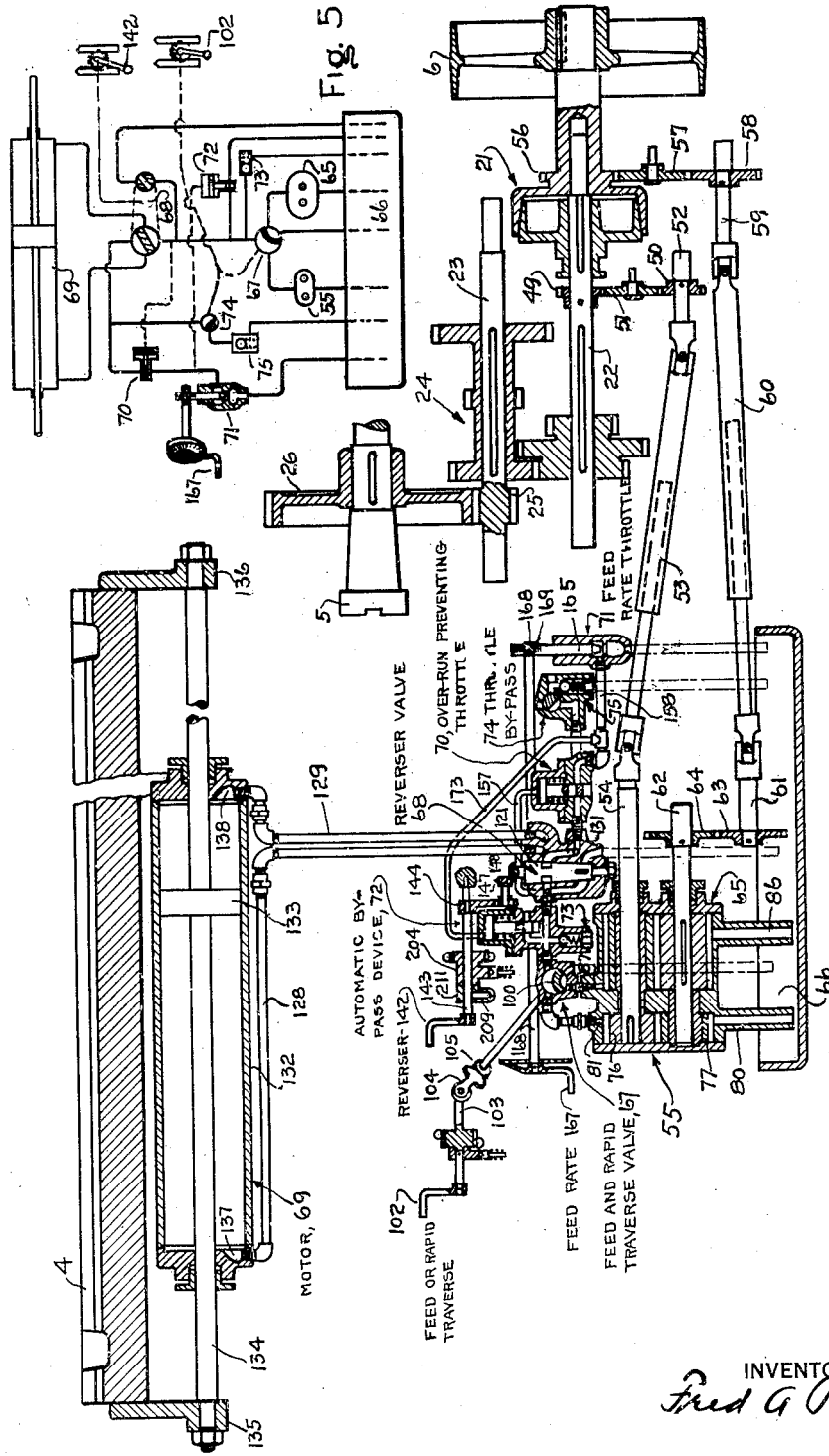

Jan. 15, 1935.　　　F. A. PARSONS　　　1,987,909
TRANSMISSION AND CONTROL MECHANISM FOR MACHINE TOOLS
Filed Sept. 2, 1931　　　4 Sheets-Sheet 3
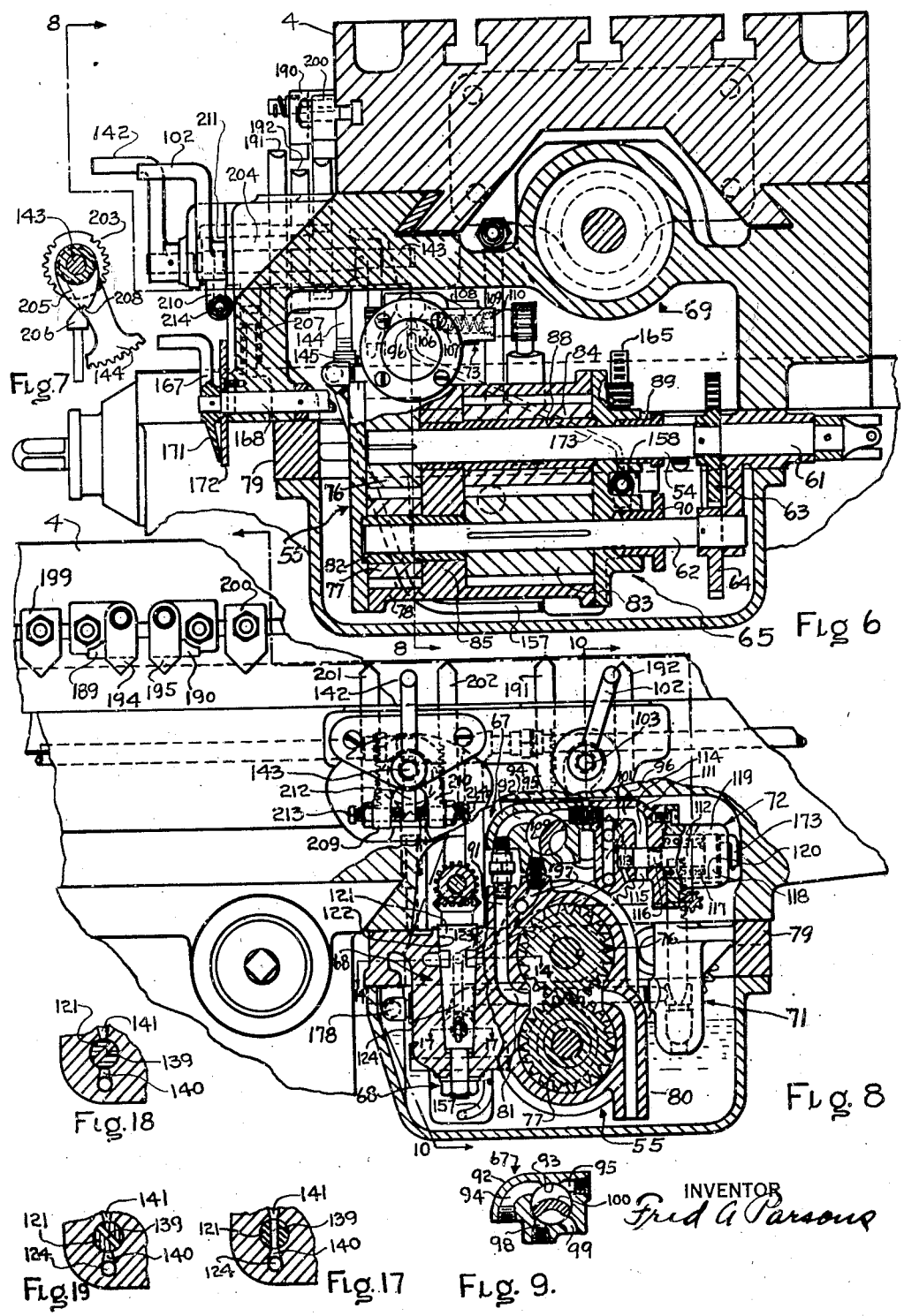
INVENTOR
Fred G. Parsons Jan. 15, 1935.  F. A. PARSONS  1,987,909
TRANSMISSION AND CONTROL MECHANISM FOR MACHINE TOOLS
Filed Sept. 2, 1931    4 Sheets-Sheet 4
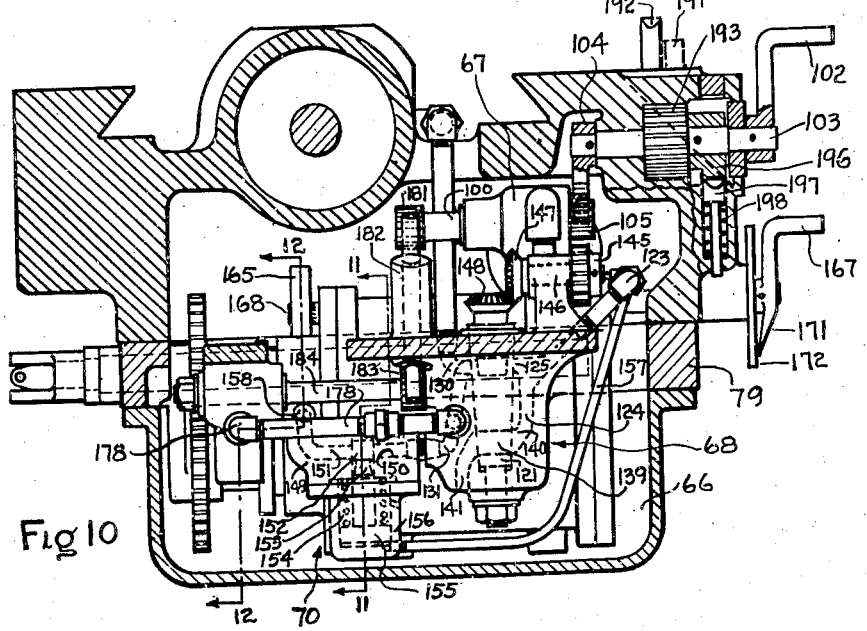
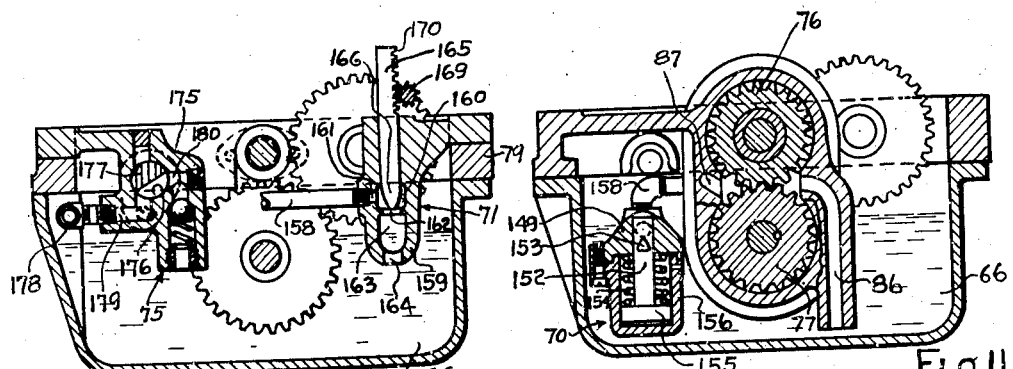
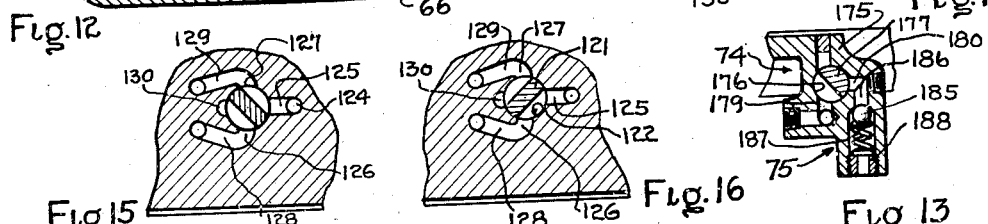
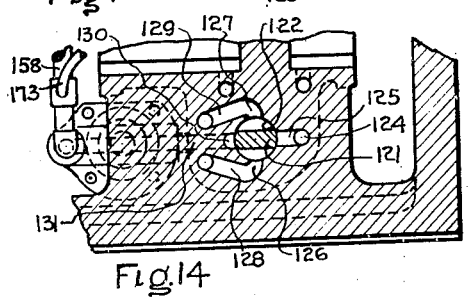
INVENTOR
Fred A. Parsons Patented Jan. 15, 1935

1,987,909

UNITED STATES PATENT OFFICE 1,987,909

TRANSMISSION AND CONTROL MECHANISM FOR MACHINE TOOLS

Fred A. Parsons, Milwaukee, Wis., assignor to Kearney & Trecker Corporation, West Allis, Wis.

Application September 2, 1931, Serial No. 560,789

15 Claims. (Cl. 90—21.5)

This invention relates to transmission and control mechanism for machine tools and more particularly for milling machines.

An object of the invention is to provide a simplified and improved transmission which is in part hydraulically operated.

A further object is to provide a hydraulic rate changer of simplified and improved form and in an improved combination with other transmission mechanism of a machine tool.

A further object is to provide a machine tool transmission including a hydraulic rate changer in which the rate is determined by a throttle but in which previous defects of a throttle controlled rate changer, which rendered such control unsuitable for use in machine tool transmissions subject to large variations in resistance, are avoided.

A further object is to provide a machine tool transmission including a throttle controlled hydraulic rate changer in which the throttle pressure is automatically maintained in spite of variations in load resistance.

A further object is to provide a machine tool transmission in which any tendency for the portion normally driven through the transmission to overrun its driving train, such, for instance, as occurs under some conditions of operation in a milling machine table drive, is prevented.

A further object is to provide an overrun preventing structure, such as just mentioned in which the overrun is prevented by valve means automatically controlled for preferred results and in advantageous relationship with other of the transmission control mechanism, particularly the rate control mechanism previously mentioned.

A further object is to combine some or all of the structure for the above mentioned objects with a machine tool transmission which provides both feed or cutting movement and rapid traverse or non-cutting movements, particularly for the movements of milling machine supports.

Other objects relate to an improved combination and relationship of structure for various of the different objects mentioned above, with other structure and mechanism of a machine tool, particularly in a milling machine.

A further object is generally to simplify and improve the construction and operation of machine tools, particularly of milling machines, and still other objects will be apparent from the following specification.

The invention consists in the particular arrangement and combination of parts herein illustrated, described, and claimed, and in such modifications of the structure illustrated and described as may be equivalent to the claims.

Like reference characters have been applied to the same parts throughout the specification and drawings in which:

Fig. 1 is a right side elevation of a milling machine embodying the invention.

Fig. 2 is a front elevation of the same machine partly broken away.

Fig. 3 is a rear elevation of the same machine also partly broken away.

Fig. 4 is a schematic sectional view in the nature of a development showing the operative relationships of various parts of the machine, particularly the transmission and control mechanism.

Fig. 5 is a diagram of the hydraulic circuits used in the machine.

Fig. 6 is a vertical sectional view taken partly on the line 6—6 of Fig. 2.

Fig. 7 is a detail of certain mechanism indicated in Fig. 6.

Fig. 8 is a sectional view on the line 8—8 of Fig. 6.

Fig. 9 is a sectional view of a valve shown in a different position in Fig. 8.

Fig. 10 is a sectional view on the line 10—10 of Fig. 8.

Fig. 11 is a sectional view on the line 11—11 of Fig. 10.

Fig. 12 is a sectional view on the line 12—12 of Fig. 10.

Fig. 13 is a sectional view of a valve indicated in Fig. 12 showing a valve member in a different position.

Fig. 14 is a horizontal sectional view on the line 14—14 of Fig. 8.

Fig. 15 is a similar view of a part of Fig. 14 showing a valve member in a different position.

Fig. 16 is a similar view showing the valve member in still a different position.

Fig. 17 is a sectional view on the line 17—17 of Fig. 8.

Fig. 18 is a similar view showing a valve member in a different position.

Fig. 19 is a similar view showing the valve member in still a different position.

As shown in Figs. 1, 2, and 3, the machine comprises a column or support 1 having slidably associated therewith for vertical adjustment a knee or support 2 carrying a saddle or support 3 horizontally slidable on the knee, the saddle carrying a table or support 4. The table is horizontally reciprocable for carrying a work piece, not shown, into cutting relation with a cutter fixed with a tool spindle 5 rotatably supported in the column 1 and axially transverse to the path of movement of table 4. A pulley 6 associated with column 1 forms a power source for driving spindle 5 and table 4 through power trains which will be later described.

Knee 2 may be vertically adjusted on column 1 by means of an elevating screw comprising inner and outer members 7 and 8 respectively, member 8 being threaded in a nut 9 supported in a portion 10 of column 1 and member 7 being threaded in a suitable bore in member 8. Member 7 at its upper end engages a thrust bearing 11 fixed with knee 2 whereby rotation of member 7 will cause vertical movement of knee 2 in familiar manner. Member 7 may be rotated by a crank, or the like, not shown, applied to a squared portion 13 of a shaft 12 journaled in the knee and driving member 7 through bevel gears 14 and 15 meshed together and fixed with shaft 12 and member 7 respectively. Knee 2 after such vertical adjustment may be clamped with column 1 by any suitable or well-known means, not shown.

Saddle 3 may be adjusted toward and from column 1 by means of a screw 16 journaled in knee 2 and prevented from axially moving therein by means of a suitable bearing 17. Screw 16 engages a nut 18 depending from saddle 3 through a suitable slot in the knee whereby rotation of the screw will cause sliding movement of the saddle in familiar manner. The screw may be rotated by a crank, or the like, not shown, applied to a squared portion 19 of the screw.

Spindle 5 is driven from pulley 6 through the following power train: Pulley 6 is fixed with and drives a sleeve 20 which drives through a main clutch generally denoted by numeral 21 a shaft 22. Shaft 22 drives a shaft 23 through a spindle rate changer generally denoted by numeral 24 and shaft 23 drives spindle 5 through gears 25 and 26 meshed together and fixed respectively with the shaft and spindle.

Main clutch 21 comprises an outer member 27 fixed with sleeve 20 and having a suitable friction surface for engaging an inner member 28 slidably keyed with shaft 22, shaft 22 having a bearing in sleeve 20 for properly centering inner member 28 with member 27. Member 28 may be moved to the left or right in Fig. 1 by means of a hand lever 29. Lever 29 is fixed with a shaft 30 journaled in column 1 and having fixed therewith inside the column a lever 31 actuating, through a pivoted link 32, a lever 33. Lever 33 is pivoted on a stud 34 fixed with the column and has an end portion carrying a pivoted shoe 35 engaging an annular groove 36 formed in member 28 whereby movement of the lever will cause movement of the member.

Spindle rate changer 24 consists of a unitary member comprising gears 37, 38, and 39 slidably keyed with shaft 22, the gears being engageable one at a time with gears 40, 41, and 42 respectively, fixed with shaft 23, the gears being of different ratios so that engagement of different pairs will result in different speeds in shaft 23. Gears 37, 38, and 39 may be shifted by means of a hand lever 43 fixed with a shaft 44 extending within column 1 and having fixed therewith a lever 45 carrying a pivoted shoe 46 engaging the sides of gear 38. Movement of lever 43 may accordingly cause shifting of the gears into desired positions. A spring pressed plunger 47 forms a grip portion for lever 43 and may engage one or another of holes such as 48 for maintaining the parts in desired shifted positions.

A feed train for movement of table 4 originates in a gear 49 fixed with shaft 22, whereby it is driven through main clutch 21. Gear 49 drives a gear 50 through an idler 51, Fig. 3, gear 50 being fixed with a shaft 52 and driving through an extensible universal joint shaft 53 of well-known type a shaft 54, Figs. 4 and 6, which constitutes the drive shaft of a feed pump generally denoted by numeral 55. Owing to the fact that the feed train is driven through clutch 21, it is impossible to drive table 4 at a feed rate unless spindle 5 is in operation.

A rapid traverse drive for table 4 originates in a gear 56, Fig. 1, fixed with sleeve 20, whereby the rapid traverse drive excludes clutch 21 and therefore is operable when spindle 5 is idle. Gear 56 drives, through an idler 57, Fig. 2, a gear 58 fixed with a shaft 59 which drives, through an extensible universal joint shaft 60, a shaft 61, Figs. 4 and 6, journaled in a portion of saddle 3 and driving a shaft 62 through gears 63 and 64 meshed together and fixed with the respective shafts. Shaft 62 constitutes the drive shaft of a rapid traverse rate pump generally denoted by numeral 65.

The course of the fluid flow during feed movement of table 4 is as follows: Referring to Figs. 4 and 5, fluid is drawn by feed pump 55 from a reservoir 66 and forced through suitable control devices including a feed rapid traverse valve generally denoted by numeral 67 and a reverser valve generally denoted by numeral 68 to a fluid operable motor generally denoted by numeral 69, arranged to drive table 4. Fluid exhausted from motor 69 returns to reservoir 66 through above mentioned reverser valve 68, an automatic overrun preventing throttle generally denoted by numeral 70, governed by the pressure of the fluid driving motor 69, and a rate control throttle generally denoted by numeral 71. Since normally the amount of fluid permitted to escape through throttle 71 represents only a part of the volume delivered by pump 55, the excess is allowed to escape through an automatic bypass valve device generally denoted by numeral 72. Valve 72 is responsive to the pressure of fluid flowing through throttle 71 and discharges fluid at various rates adapted to keep the pressure at throttle 71 substantially constant under varying degrees of resistance to movement of table 4 so that the rate of movement of table 4 is always proportioned to the opening of throttle 71. In case of excessive resistance to table movement, fluid may escape through an overload relief valve generally denoted by numeral 73.

During rapid traverse movement of table 4 the course of fluid movement is as follows: Fluid is drawn from reservoir 66 by rapid traverse pump 65 and forced through above mentioned feed rapid traverse valve 67 and reverser valve 68 to motor 69, fluid returning from motor 69 passing through reverser valve 68, a throttle by-pass valve generally denoted by numeral 74, and a back pressure valve generally denoted by numeral 75 to reservoir 66. Thus the relatively large volume of fluid flowing during rapid traverse movement is not forced to pass through rate control throttle 71 or other channel restricting devices.

The feed pump 55 may be of any suitable, well-known form, but in this instance comprises gears or impellers 76 and 77 meshed together in a portion of a closely fitting housing 78 fixed with a member 79, as particularly shown in Fig. 6, the housing providing an inlet port 80, and Fig. 8, communicating with a reservoir 66, and an outlet port 81. Gear 76 is fixed with shaft 54 and gear 77 is journaled on a sleeve 82, Fig. 6, fixed in housing 78.

Rapid traverse pump 65 may be of any suitable, well-known form, but in this instance comprises gears or impellers 83 and 84, Figs. 4 and 6, meshed together in a portion of housing 78 separated from feed pump 55 by a partition portion 85 and providing an inlet port 86, Fig. 11, and an outlet port 87. Gear 83 is fixed with shaft 62, Fig. 6, which is journalled in a wall of housing 78 and in above mentioned sleeve 82. Gear 84 is journaled on a sleeve 88 fixed in housing 78 and forming also a bearing for shaft 54 which passes through the sleeve to reach feed pump gear 76. Suitable glands 89 and 90 or other expedients may be provided to prevent leakage of fluid from housing 78 around shafts 54 and 62.

Feed pump outlet port 81 connects, as shown in Fig. 8, with a passage 91 communicating with rapid traverse valve 67, the valve comprising a housing member 92, Fig. 9, having a bore 93 horizontally disposed therein, passage 91 connecting with a port 94 entering bore 93 at an upper portion thereof. A port 95 enters bore 93 adjacent port 94 and connects with a passage 96, Fig. 8, and during feeding movement of table 4 fluid flows from passage 91 through port 94, bore 93, port 95, passage 96, and on to motor 69. Rapid traverse pump outlet port 87, Fig. 11, connects with a passage 97, Fig. 8, which connects with a port 98, entering bore 93 of valve 67 at a lower part thereof, and an exhaust port 99 also enters bore 93 adjacent to port 98. A valve member 100 is rotatively fitted in bore 93 and may be moved to connect passage 91 with passage 96 while simultaneously connecting passage 97 with exhaust port 99 whereby fluid from feed pump 55 is delivered through passage 96 to a passage 101 and motor 69, while fluid from rapid traverse pump 65 is by-passed through exhaust port 99 to reservoir 66, as particularly shown in Fig. 9. In the position of member 100 shown in Fig. 8 fluid from rapid traverse pump 65 is added to fluid from feed pump 55 and delivered to motor 69, exhaust port 99 being closed by member 100 as shown.

Member 100 may be rotated from a hand lever 102, Figs. 4 and 10, lever 102 being fixed with a shaft 103 journaled in saddle 3 and actuating, through a sector 104, a gear 105 fixed with valve member 100.

Excessive pressure in passage 101 may be relieved through above mentioned valve 73, Figs. 4 and 6, the valve comprising a port 106 leading from passage 101 and closed by a ball valve member 107, a spring 108 being retained in a bore 109 by means of a nut 110 and pressing against member 107.

Since pump 55 is of a constant displacement type and preferably of a capacity somewhat in excess of that necessary to supply fluid to motor 69 for a maximum feed rate, there will be pumped at all times a certain excess of fluid over that necessary to produce the desired rate of movement of table 4. This excess of fluid is exhausted from passage 96 through above mentioned automatic by-pass valve device 72. The device, as shown in Fig. 8, comprises a body portion 111 supported from member 79 and having a slidable plunger 112 fitted in a suitable bore 113. An inlet port 114 enters bore 113 and an outlet port 115 also enters the bore at a point substantially opposite port 114, port 114 leading from passage 96, and port 115 communicating freely with reservoir 66. Plunger 112 has a port 116 which may register more or less with ports 114 and 115 in certain positions. The plunger may be urged to the right in Fig. 8 by means of a spring 117 acting against a piston 118 fixed with the plunger and slidable in a cylinder 119 having a bore 120, and to the left by fluid pressure acting on the surface of piston 118. Fluid pressure from another part of the system may accordingly be utilized to determine the amount of fluid escape through ports 114 and 115, as will be presently explained.

Reverser valve 68 comprises, as shown in Fig. 8, a rotatable plug member 121 fitted in a suitable bore 122 in member 79 and having cut-away portions in an upper portion thereof as shown in Fig. 14. Above mentioned passage 101 connects with a passage 123, Figs. 8 and 10, which communicates with a passage 124 extending substantially parallel to plug member 121. A port 125 leads from passage 124 into bore 122 substantially at the level of the cut-away portions, and ports 126 and 127, Fig. 14, enter bore 122 at substantially the same level and connect respectively with passages 128 and 129 leading to motor 69. An exhaust port 130 enters bore 122 substantially opposite port 125 and communicates with a passage 131 leading to certain control devices to be explained presently.

Motor 69 comprises, as shown in Figs. 2 and 4, a cylinder 132 fixed with saddle 3 and having a piston 133 slidably fitted therein and fixed with a piston rod 134. The piston rod is fixed at its ends with table 4 by means of brackets 135 and 136 whereby movement of piston 133 will cause movement of table 4. Above mentioned passage 128 communicates with a port 137 leading into the left end of cylinder 132 and passage 129 communicates with a port 138 leading into the right end thereof. Accordingly with reverser valve member 121 in the position shown in Fig. 16, fluid from port 125 will pass through bore 122 into passage 128 and to the left end of cylinder 132, moving piston 133 and table 4 to the right, while fluid already in the right end of cylinder 132 will be expelled through port 138, passage 129, bore 122, and port 130 and returned to reservoir 66. With the valve member in the position shown in Fig. 15, fluid will pass in a similar manner through passage 129 to the right end of motor cylinder 132, moving piston 133 to the left, fluid from the left end of the cylinder passing to the reservoir through passage 128 and port 130.

With valve member 121 in the position shown in Fig. 14, fluid is prevented from entering either of passages 128 or 129 and piston 133 and table 4 do not move. Since escape of fluid from either of passages 128 or 129 is prevented, the table is also locked against undesired movement under these conditions. To provide a free discharge of fluid from the pumps in this situation, valve member 121 has at a lower level therein a port 139, Figs. 10 and 17, which may register in this position with a port 140, forming an extension of passage 124 and with a port 141 opening freely into reservoir 66, as more particularly shown in Fig. 10. In the positions of valve member 121 indicated in Figs. 15 and 16, port 139 resumes the positions shown in Figs. 18 and 19 respectively, whereby port 140 is closed by valve member 121 and fluid must pass on to motor 69, as above outlined.

Valve member 121 may be moved from a hand lever 142, Figs. 4, 6, 7, 8, and 10, the lever being fixed with a shaft 143 journaled in saddle 3 and having fixed on an intermediate portion thereof a sector 144 engaging a gear 145 fixed with a shaft 146 journaled in a portion of member 79. Shaft 146 actuates valve member 121 through bevel gears 147 and 148 fixed respectively with the shaft and member. Accordingly, if lever 142 is moved to the left in Fig. 8, valve member 121 will be rotated into the position shown in Fig. 15, whereupon table 4 will move to the left, while, if lever 143 is moved to the right, opposite movement of the valve member and table will occur.

In a milling machine it is essential that the table be prevented from running at a rate in excess of that intended to be determined by its transmission. In the present instance this is accomplished by preventing escape of fluid from the advancing side of piston 133 at a rate higher than desired. For this purpose above mentioned throttle valve generally denoted by numeral 70 is provided, Figs. 4, 5, 10, and 11. The valve comprises a body portion 149 supported from member 79 and having inlet and outlet ports 150 and 151 respectively. A plunger 152 is slidably fitted in a bore in body 149 intersecting ports 150 and 151 and has a port 153 therethrough adapted to register more or less with ports 150 and 151 according to the axial position of the plunger. A spring 154 acts against a piston head 155 fixed with plunger 152 to force the plunger down and fluid pressure may act in a cylinder 156 against piston head 155 to force the plunger up against the resistance of spring 154. Port 130 of reverser valve 68 is connected with inlet port 150 by means of a passage 131.

Fluid pressure is admitted to cylinder 156 from passage 123 through a pipe 157 whereby plunger 152 will take up a position responsive to the pressure driving piston 133. Obviously spring 154 may be so proportioned as to give any desired degree of opening through port 153 for a given motor driving pressure in passage 123 whereby it is possible to provide any degree of back pressure against piston 133 which may be found desirable under various operating conditions. In the event that table 4 and piston 133 were to be moved from any outside force at a rate greater than intended, an immediate drop in pressure would result on the retreating side of the piston and accordingly in passage 123. Accordingly a similar drop of pressure would take place in cylinder 156 and a downward movement of plunger 152 would occur under the influence of spring 154, restricting passage 150 and causing an immediate rise in pressure in port 130 and against the advancing side of piston 133 sufficient to check such tendency.

Port 151 of throttle 70 communicates through a duct 158 with rate control throttle 71, Fig. 12. The throttle comprises a body portion 159 fixed with member 79 having a chamber 160 therein receiving fluid from duct 158 through an inlet port 161, the fluid passing out through a port 162 into a discharge chamber 163 and thence to reservoir 66 through a discharge port 164. A plunger 165 is vertically reciprocable in a suitable bore in body portion 159 and enters chamber 160. A tapered end portion 166 of plunger 165 may close port 162 more or less according to the axially adjusted position of plunger 165 whereby to regulate the rate of fluid flow from duct 158. Plunger 165 may be vertically adjusted from the hand lever 167, Figs. 1, 4, and 6. Lever 167 is fixed with a shaft 168 journaled in saddle 3 and actuating plunger 165 through gear teeth 169, Fig. 12, formed in the shaft and engaging rack teeth 170 formed in the plunger. An index 171 is provided fixed with lever 167 and indicating against a dial 172 adjusted positions of plunger 165, the dial being graduated in any suitable increments, as shown, preferably in terms of feed rates in table 4. Any suitable or well-known means may be provided for preventing undesired movement of lever 167. For actuation of by-pass device 72, a duct 173 communicates from passage 158 to cylinder 119, as particularly shown in Figs. 4 and 6.

The operation of the complete feed system may be outlined as follows: Assuming a definite load on table 4 and throttle 71 set for a predetermined speed, upon starting of feed pump 55 fluid will pass through passage 91 into passage 96. At this point port 114 will be closed by an imperforate portion of plunger 112, there being no pressure in cylinder 119. Fluid will pass on through passages 101, 123 and reverser valve 68 to one end of cylinder 132, tending to move piston 133, but such movement will be blocked by fluid in the opposite end of cylinder 132, since the outlet passage 131 is blocked by plunger 152. The pressure in passage 123 will accordingly rise to a predetermined point and, acting through pipe 157, will cause movement of piston 155 and plunger 152 of valve 70 to provide an outlet for fluid in passage 131 through ports 150 and 153, the result being to allow movement of plunger 133, but to maintain a predetermined desirable back pressure against the movement thereof.

Fluid passing through port 153 is transmitted through port 151 and duct 158 and escapes to reservoir 66 through throttle 71. The restriction of flow caused by throttle 71 results in a rise in pressure in duct 158 and this is transmitted through duct 173 to cylinder 119 of by-pass device 72. The pressure in passage 158 reaching a desired point, piston 118 is forced to the left in Fig. 8 against spring 117, causing port 116 to register with port 114 and allowing escape from passage 96 of part of the fluid coming from pump 55. This escape of fluid will prevent a further rise of pressure in passages 96 and 132 and cause the predetermined pressure in passage 158 to remain substantially constant.

Thus in the event of the load on table 4 increasing, piston 133 would tend to decrease in speed, and pressure on the advancing side of piston 133, and accordingly in passage 158, would normally decrease. The decrease in pressure, however, would be immediately communicated to cylinder 119, spring 117 then acting against the diminished pressure in the cylinder to move plunger 112 to the right in Fig. 8, thereby reducing the effective area of port 114 and accordingly the amount of fluid escaping therethrough. This would cause a rise of pressure in passages 96 and 132, thereby tending to maintain the rate of table 4 in spite of the increased resistance to travel thereof. The increase in speed in piston 133 would tend to substantially restore the normal pressure in passage 158, whereby the rate of discharge of fluid through throttle 71 and consequently the predetermined rate of table 4 will be restored.

Conversely a reduction in the resistance to travel of table 4 would tend to cause an increase in rate of piston 133 and a rise in pressure in passage 158. In a manner similar to the above, this pressure would be transmitted to cylinder 119 and cause an increase in the amount of fluid allowed to escape through port 114. The pressure in passage 96 would accordingly be reduced to give a normal rate in table 4 and the normal pressure in passage 158 would be restored. In the event of a tendency to overrun on the part of table 4, the above action will take place to the extent of a decided reduction of pressure in passage 96 and at any predetermined desirable point in such reduction throttle valve 70 will operate as above outlined to restrict passage 131 independently of throttle 71, sufficiently to prevent movement of piston 133 faster than desired.

While the above operation has for convenience been described as progressive in character, it is to be understood that the proportions of the parts and passages are such that the various changes and adjustments take place practically instantaneously, so that a substantially uniform rate of movement of table 4 is maintained under all normal conditions of operation.

When rapid traverse movement of table 4 is desired, valve 67 is placed, as above outlined, in the position shown in Fig. 8 when fluid in large volume is delivered to passage 96 for causing relatively rapid movement in motor 69. At such times fluid from the advancing side of piston 133 returns to reservoir 66 independently of valve 70 or throttle 71 through throttle by-pass valve 74. As shown in Figs. 4, 12, and 13, this valve comprises a body portion 175 fixed with member 79 and having a bore 176 in which is rotatively fitted a valve member 177. A pipe 178 leads from passage 131 and connects with a port 179 which opens into bore 176, a port 180 also entering bore 176 adjacent thereto and communicating with reservoir 66 through back pressure valve 75. Member 177 has a cut-away portion which in one position of the member (Fig. 12) connects ports 179 and 180, but in another position blocks port 180, as shown in Fig. 13.

During feed operation member 177 stands in the position shown in Fig. 13 whereby fluid is forced to pass to reservoir 66 from motor 69, through valve 70 and throttle 71, as above outlined. During operation at a rapid traverse rate, however, member 177 stands in the position indicated in Fig. 12 and fluid is allowed to pass from passage 178, through bore 176, and port 180, to reservoir 66, through back pressure valve 75. Movement of valve member 177 is obtained dependently with valve member 100 of feed rapid traverse valve 67 as follows: Valve member 100, Fig. 10, actuates, through a gear 181 fixed therewith, a rack plunger 182 slidable in a portion of member 79 and having suitable rack teeth engaging a gear 183 fixed with an elongated stem portion 184 of valve member 177. The parts are so related that when valve member 100 stands in the position indicated in Fig. 8 for rapid traverse movement of table 4, valve member 177 stands in the position indicated in Fig. 12, allowing relatively free escape of the comparatively large volume of fluid flowing in the system at such times. When valve member 100 stands in the position shown in Fig. 9, valve member 177 stands in the position indicated in Fig. 13 and the relatively small volume of fluid then flowing is forced to pass through the control devices above described.

Back pressure valve 75 comprises a ball valve member 185, Figs. 12, 13, pressed against a suitable seat in a passage 186 leading from port 180 by means of a spring 187 retained in position by means of a nut 188 having a suitable opening for passage of fluid.

Automatic operation of table 4 may be obtained in any suitable or well-known manner, for example, change from feed movement to rapid traverse may be obtained by dogs, or the like, 189 and 190, Figs. 2 and 8, adjustably fixed with table 4 by means of a T-slot or other suitable or well-known expedient, contacting respectively plungers 191 and 192, Fig. 8, vertically slidable in saddle 3 and having rack teeth engaging opposite sides of a gear 193, Fig. 10, fixed with shaft 103. Plungers 191 and 192 are located at different distances from table 4 as shown in Fig. 6 so that a given dog may contact one and not the other, and dogs 189 and 190 in the present instance are shown as of the latch type having respectively pivoted contact portions 194 and 195 to be effective while traveling in one direction and ineffective while traveling in the opposite direction for purposes well understood. A cam 196, Fig. 10, is fixed with shaft 103 and engages a plunger 197 vertically slidable in saddle 3 and pressed against cam 196 by means of a spring 198, the plunger acting to yieldingly maintain the parts in shifted position. Dogs 189 and 190 may obviously be located in various desired positions and other dogs similar thereto might be applied within the scope of the invention to produce substantially as many changes from rapid traverse to feed or vice versa as desired during travel of table 4 in either direction.

The above construction and operation are illustrative merely, other expedients for shifting from feed to rapid traverse, or vice versa, being contemplated, for example, a rapid traverse valve corresponding to valve 67 might be provided which would connect pumps 55 and 65 alternatively to motor 69 and by-pass the pump not in use instead of leaving pump 55 permanently connected and by-passing merely pump 65, as is done in the illustrated embodiment. For automatic operation a lost motion or "snap-over" device of well-known type would then be used in connection with plungers 191 and 192 in a manner well understood, as, for example, in the case of the reverser valve actuating means described below.

Automatic control of reverser valve 68 may be had through dogs 199 and 200, Figs. 2 and 8, adjustably fixed with table 4 and contacting respectively plungers 201 and 202 vertically slidable in saddle 3 and having rack teeth engaging opposite sides of a gear 203, Figs. 6 and 7, fixed with a sleeve 204 journaled on shaft 143. Sleeve 204 has a cam 205 fixed therewith cooperating with a plunger 206 pressed upwardly against the cam by a spring 207, plunger 206 having an end portion adapted to cooperate with a central notch 208 formed in cam 205. Arms 209 and 210, Fig. 8, extend downwardly from a member 211 fixed with sleeve 204 and journaled on shaft 143 on opposite sides of a tongue 212 extending downwardly from shaft 143, and screws 213 and 214 are threaded in respective arms in position to contact tongue 212, the whole constituting a lost motion device of familiar form adapted to allow selectively automatic reverse or stop of table 4 during travel in either direction, and at any point determined by the location of dogs 199 and 200.

Thus if screws 213 and 214 are set to provide no lost motion between sleeve 204 and shaft 143, upon contact of one of dogs 199 or 200 with its plunger, movement of reverser valve member 121 will be initiated from one of the positions shown in Figs. 15 and 16 toward that indicated in Fig. 14. At the time that valve member 121 reaches the position shown in Fig. 14, flow of fluid to motor 69 will be cut off and table 4 will stop, but not until cam 205 has been turned sufficiently for plunger 206 to engage central notch 208. However, if lost motion is provided between sleeve 204 and shaft 143 through proper adjustment of one or the other or both of screws 213 and 214, movement of valve member 121, which is dependent upon movement of shaft 143, and not upon movement of sleeve 204, will lag appreciably behind the movement of sleeve 204 and accordingly of cam 205. Before valve member 121 reaches the position shown in Fig. 14, cam 205 will therefore have moved by the position in which plunger 206 engages notch 208 and the plunger, under the influence of spring 207 and acting against a side portion of cam 205, will continue movement of the cam sufficiently to shift valve member 121, through shaft 143 and its connected parts, into position for opposite table movement. It is accordingly possible through proper selection and location of dogs 199, 200, 189, and 190 (and others of similar type if necessary) to obtain substantially any cycle of automatic movement or any combination of shifts from feed to rapid traverse or rapid traverse to feed, or reverse or stop desired.

The above is a complete description of a machine illustrative of the invention, but it is not to be taken as limiting the invention except as defined in the annexed claims.

What is claimed is:

1. In a milling machine, the combination of a rotatable tool spindle, a spindle support, a work support adjacent said spindle and movable relative to said spindle support in a direction transverse to the spindle axis, a transmission for said relative movement including a pump and a fluid operable motor, a motor inlet channel extending from said pump to said motor, and a fluid outlet channel from said motor; and control mechanism for said transmission including a first throttle associated with said outlet channel and adjustable to a variety of positions respectively corresponding to different rates of said motor, a second adjustable throttle associated with said outlet channel and positioned between said first throttle and the motor outlet port, said second throttle being pressure operable, a pressure operable by-pass device associated with said inlet channel, means controlling said by-pass device from the pressure in said outlet channel between said first and second throttles, said by-pass device and control means therefor being operable to by-pass fluid from said inlet channel in excess of that required to maintain a substantially constant predetermined pressure on said first throttle, and means controlling said second throttle in accordance with the pressure in said motor inlet channel; whereby to change the back pressure on said motor in accordance with variations in resistance to said relative movement of said supports while maintaining a substantially constant rate of said relative movement irrespective of said variation in resistance.

2. In a milling machine, the combination of a rotatable tool spindle, a spindle support, a work support adjacent said spindle and movable relative to said spindle support in a direction transverse to the spindle axis, a transmission for said relative movement including a pump, and a fluid operable motor, a motor inlet channel extending from said pump to said motor, and a fluid outlet channel from said motor; and control mechanism for said transmission including a throttle associated with said outlet channel and adjustable to a variety of positions respectively corresponding to different rates of said motor, a pressure operable by-pass device associated with said motor inlet channel and operable for release of fluid therefrom, and a fluid conduit connecting said device for operation from the pressure in said outlet channel at a point between said motor and said throttle, the arrangement of said by-pass device and conduit being such as to by-pass all fluid from said inlet channel in excess of the fluid required to maintain a substantially constant predetermined pressure at said point in said outlet channel whereby to maintain a motor rate predetermined in accordance with the adjustment of said throttle.

3. In a milling machine, the combination of a rotatable tool spindle, a spindle support, a work support adjacent said spindle and movable relative to said spindle support in a direction transverse to the spindle axis, a transmission for said relative movement including a pump, and a fluid operable motor, a motor inlet channel extending from said pump to said motor, and a fluid outlet channel from said motor; and control mechanism for said transmission including a throttle associated with one of said channels and adjustable to a variety of positions respectively corresponding to different rates of said motor, a fluid by-pass device associated with said inlet channel and operable for release of fluid therefrom, and control means for said device operative in accordance with pressure variations in one of said channels for the release of all fluid from said motor inlet channel in excess of fluid required to maintain the particular one of said motor rates corresponding to the position of adjustment of said throttle.

4. In a milling machine, the combination of a rotatable tool spindle, a spindle support, a work support adjacent said spindle movable relative to said spindle support in a direction transverse to the spindle axis, a transmission for said relative movement including a feed pump, a quick traverse pump and a fluid operable motor, a motor inlet channel connectible to receive fluid from said pumps, and an outlet channel from said motor; and control mechanism for said transmission including a throttle associated with said outlet channel and adjustable to a variety of positions respectively corresponding to different rates of said motor, a pressure operable by-pass device associated with said inlet channel, means controlling said by-pass device in accordance with variations from a predetermined fluid pressure in a portion of said outlet channel between said motor and said throttle, valve means associated with said inlet channel and shiftable to a plurality of positions respectively to connect or to disconnect said quick traverse pump, valve means associated with said outlet channel and shiftable to a plurality of positions respectively to maintain said predetermined fluid pressure in said portion of said outlet channel or to substantially reduce the fluid pressure therein, and motion transmitting connections operable between the different valve means for reducing said predetermined pressure whenever said quick traverse pump is connected and vice versa.

5. In a milling machine, the combination of a rotatable tool spindle, a spindle support, a work support adjacent said spindle movable relative to said spindle support in a direction transverse to the spindle axis, a transmission for said relative movement including a feed pump, a quick traverse pump and a fluid operable motor, a motor inlet channel connectible to receive fluid from said pumps, and an outlet channel from said motor; and control mechanism for said transmission including a first throttle associated with said outlet channel and adjustable to a variety of positions respectively corresponding to different rates of said motor, a second adjustable throttle associated with said outlet channel and positioned between said first throttle and the motor outlet port, said second throttle being pressure operable, a pressure operable by-pass device associated with said inlet channel, means controlling said by-pass device in accordance with the pressure in said outlet channel between said first and second throttles, means controlling said second throttle in accordance with the pressure in said motor inlet channel, valve means associated with said inlet channel and shiftable to a plurality of positions respectively to connect or to disconnect said quick traverse pump, valve means associated with said outlet channel and shiftable to a plurality of positions respectively to open and to close a passageway leading from said outlet channel at a point between said second throttle and said motor, and motion transmitting connections operable between said valve means for opening said passageway whenever said quick traverse pump is connected and vice versa.

6. In a milling machine, the combination of a rotatable tool spindle, a spindle support, a work support, said supports being relatively movable in either of opposite directions each transverse to the axis of said spindle, a transmission for said relative movement including a pump having an outlet port and a fluid operable motor having a plurality of ports, a fluid reservoir, a reverser valve, a first channel connecting said reverser valve with said pump outlet port, a plurality of conduits respectively connecting said reverser valve with different of said motor ports, and a second channel connecting said reverser valve with said reservoir; and control mechanism for said transmission including a throttle associated with one of said channels and adjustable to a variety of positions respectively for different rates of said motor, a pressure operable by-pass device associated with said first channel, and means controlling said by-pass device in accordance with variations in the fluid pressure determinative of the rate of fluid flow through said throttle; whereby to maintain a particular motor rate corresponding to a particular position of throttle adjustment irrespective of variations in resistance to said relative movement and irrespective of the direction thereof.

7. In a milling machine, the combination of a rotatable tool spindle, a spindle support, a work support, said supports being relatively movable in either of opposite directions each transverse to the axis of said spindle, a transmission for said relative movement including a pump having an outlet port and a fluid operable motor having a plurality of ports, a fluid reservoir, a reverser valve, a first channel connecting said reverser valve with said pump outlet port, a plurality of channels respectively connecting said reverser valve with different of said motor ports, and a second channel connecting said reverser valve with said reservoir; and control mechanism for said transmission including a throttle associated with said second channel and adjustable to a variety of positions respectively corresponding with different rates of said motor, a pressure operable by-pass device associated with said first channel, and means controlling said by-pass device in accordance with pressure variations in a portion of said second channel between said reverser valve and said throttle.

8. In a milling machine, the combination of a rotatable tool spindle, a spindle support, a work support, said supports being relatively movable in either of opposite directions each transverse to the axis of said spindle, a transmission for said relative movement including a pump having an outlet port and a fluid operable motor having a plurality of ports, a fluid reservoir, a reverser valve, a first channel connecting said reverser valve with said pump outlet port, a plurality of channels respectively connecting said reverser valve with different of said motor ports, and a second channel connecting said reverser valve with said reservoir; and control mechanism for said transmission including a first throttle associated with said second channel and adjustable to a variety of positions respectively corresponding with different rates of said motor, a second adjustable throttle associated with said second channel and positioned between said reverser valve and said first throttle, said second throttle being pressure operable, a pressure operable by-pass device associated with said first channel, means controlling said by-pass device in accordance with fluid pressure in said second channel between said first and second throttles, and means controlling said second throttle in accordance with pressure in said first channel.

9. In a machine tool, the combination of a tool support, a work support, said supports being relatively movable in forward and reverse directions, a transmission for said relative movement including a source of pressure fluid and a fluid operable motor having a plurality of ports, a fluid reservoir, reverser valve means, a first channel connecting said reverser valve means and said fluid source, a plurality of channels respectively connecting said reverser valve means with different of said motor ports, and a second channel connecting said reverser valve means with said reservoir; and control mechanism for said transmission including a rate control throttle adjustable to a variety of positions respectively corresponding to different rates of said motor, a control member adjustable to a plurality of positions respectively operable to effect one of said throttle controlled motor rates or to effect a relatively high quick traverse rate of said motor, a pressure operable by-pass device associated with said first channel, control means operable in accordance with variations in the pressure determinative of rate of fluid flow through said throttle for control of said by-pass device, said by-pass device and said control means therefor being effective to by-pass all fluid from said first channel in excess of fluid required to maintain the particular motor rate corresponding to the position of adjustment of said throttle, and means operable in accordance with the position of adjustment of said control member to render said control means inoperative when said control member is in said quick traverse position, and vice versa.

10. In a machine tool, the combination of a tool support, a work support, said supports being relatively movable in forward and reverse directions, a transmission for said relative movement including a source of pressure fluid and a fluid operable motor having a plurality of ports, a fluid reservoir, reverser valve means, a first channel connecting said reverser valve means and said fluid source, a plurality of channels respectively connecting said reverser valve means with different of said motor ports, and a second channel connecting said reverser valve means with said reservoir; and control mechanism for said transmission including a rate control throttle adjustable to a variety of positions respectively corresponding to different rates of said motor, a control member adjustable to a plurality of positions respectively operable to effect one of said throttle controlled motor rates or to effect a relatively high quick traverse rate of said motor, a pressure operable by-pass device associated with said first channel, a second adjustable throttle associated with said second channel, control means operable in accordance with variations in the pressure determinative of the rate of fluid flow through said rate control throttle for control of said by-pass device, said by-pass device and said control means therefor being effective to by-pass all fluid from said first channel in excess of fluid required to maintain the particular motor rate corresponding to the position of adjustment of said rate control throttle, means operable in accordance with the position of adjustment of said control member to render said control means inoperative when said control member is in said quick traverse position and vice versa, pressure means operative from pressure in said first channel for control of said second throttle, valve means associated with said second channel and adjustable to a plurality of positions, one of which is operable to by-pass fluid from said second channel to avoid fluid flow through said second throttle, and means operable in accordance with the position of adjustment of said control member to adjust said valve means to said by-pass position when said control member is in said quick traverse position.

11. In a machine tool, the combination of a tool support, a work support, said supports being relatively movable in forward and reverse directions, a transmission for said relative movement including a source of pressure fluid and a fluid operable motor having a plurality of ports, a fluid reservoir, reverser valve means, a first channel connecting said reverser valve means and said fluid source, a plurality of channels respectively connecting said reverser valve means with different of said motor ports, and a second channel connecting said reverser valve means with said reservoir; and control mechanism for said transmission including a rate control throttle associated with said second channel and adjustable to a variety of positions respectively corresponding to different rates of said motor, a control member adjustable to a plurality of positions respectively operable to effect one of said throttle controlled motor rates or to effect a relatively fast quick traverse rate of said motor, a pressure operable by-pass device associated with said first channel, control means for said by-pass device and operable in accordance with variations in the pressure in a portion of said second channel between said reverser and said throttle, said by-pass device and said control means therefor being operative to by-pass all fluid from said first channel in excess of fluid required to maintain a predetermined fluid pressure in said second channel portion, valve means positioned in said second channel between said reverser and throttle and adjustable to a plurality of positions, one of which is operable to reduce said predetermined pressure in said portion of said second channel whereby to render said control means for said by-pass device inoperative, and means operable in accordance with the position of said control member to adjust said valve means to said pressure reducing position whenever said control member is in said quick traverse position.

12. A machine tool as specified in claim 9 in which said reverser valve means is adjustable to a plurality of positions respectively connecting said first channel with different of said plurality of channels and to another position, and including a third channel connecting said reverser valve means with said reservoir, said reverser valve means being effective in said other position to connect said first and said third channels.

13. In a machine tool, the combination of a tool support, a work support, said supports being relatively movable in forward and reverse directions, a transmission for said relative movement including a source of pressure fluid and a fluid operable motor having a plurality of ports, a fluid reservoir, reverser valve means, a first channel connecting said reverser valve means and said supply source, a plurality of channels respectively connecting said reverser valve means with different of said motor ports, and a second channel connecting said reverser valve means with said reservoir; and control mechanism for said transmission including a rate control throttle adjustable to a variety of positions respectively corresponding to different rates of said motor, a pressure operable by-pass device associated with said first channel, and means operable in accordance with variations in the pressure effective for flow of fluid through said channels for control of said by-pass device, said by-pass device and said control means therefor being automatically operable to by-pass from said first channel all fluid in excess of fluid required to maintain the motor rate corresponding to the position of adjustment of said throttle.

14. In a milling machine, the combination of a rotatable tool spindle, a work table adjacent said spindle and reciprocable relative thereto in a direction transverse to the axis thereof, a spindle support uprising adjacent a longitudinal edge of said table and at one side of a vertical plane passing through said edge, a table transmission including a source of fluid under pressure, a fluid operable motor having a plurality of ports, a fluid reservoir, adjustable reverser valve means, a fluid channel connecting said fluid source with said reverser valve means, a plurality of channels respectively connecting said reverser valve means with different of said motor ports, a fluid channel connecting said reverser with said reservoir, a throttle associated with one of said channels and adjustable to a variety of positions respectively corresponding to different rates of said motor, a pressure operable by-pass device associated with said first channel, control means for said by-pass device and operable in accordance with the variations in pressure effective for flow of fluid through said throttle, said by-pass device and control means therefor being operable to by-pass all fluid from said first channel in excess of that required to maintain said effective pressure at substantially constant value, a control member for adjustment of said throttle, and a control member for adjustment of said reverser valve means, said control members being independently operable and each having a portion exposed for manual operation at the other side of said vertical plane.

15. In a milling machine, the combination of a rotatable tool spindle, a work table adjacent said spindle and movable in a direction transverse to the axis thereof, a spindle train driven at substantially constant speed and including a speed changing device, a table transmission driven from said spindle train to exclude said speed changing device and including a constant volume uni-directional output pump having an outlet port and a fluid operable motor having a plurality of ports, a fluid reservoir, reverser valve means, a first channel connecting said pump port with said reverser valve means, a plurality of channels respectively connecting said reverser valve means with different of said motor ports, a second channel connecting said reverser valve means with said reservoir; and control mechanism for said table transmission including a rate control throttle associated with one of said first or second channels and adjustable to a variety of positions respectively corresponding to different rates of said motor, a pressure responsive by-pass device associated with said first channel, control means for said by-pass device and connected for operation in accordance with variations in the fluid pressure effective to force fluid through said rate control throttle, said by-pass device and control means therefor being automatically operative to release from said first channel all fluid in excess of the fluid required to maintain said effective fluid pressure substantially constant at a predetermined value, a trip device adjacent said table and connected for operation of said reverser, a table dog operable during movement of said table to operate said trip device, a manually movable member connected for said adjustment of said rate control throttle, and means including elements relatively movable in accordance with the movement of said member for visibly indicating the position of adjustment of said throttle.

FRED A. PARSONS.